United States Patent
Xu et al.

(10) Patent No.: US 11,315,326 B2
(45) Date of Patent: Apr. 26, 2022

(54) EXTENDED REALITY ANCHOR CACHING BASED ON VIEWPORT PREDICTION

(71) Applicant: AT&T Intellectual Property I, L.P., Atlanta, GA (US)

(72) Inventors: Tan Xu, Bridgewater, NJ (US); David Crawford Gibbon, Lincroft, NJ (US); Bo Han, Bridgewater, NJ (US); Eric Zavesky, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 16/653,351

(22) Filed: Oct. 15, 2019

(65) Prior Publication Data

US 2021/0110610 A1     Apr. 15, 2021

(51) Int. Cl.
*G06T 19/00* (2011.01)
*G06F 3/01* (2006.01)
*G02B 27/01* (2006.01)
*G06K 9/00* (2022.01)

(52) U.S. Cl.
CPC .......... *G06T 19/006* (2013.01); *G02B 27/017* (2013.01); *G06F 3/011* (2013.01); *G06F 3/017* (2013.01); *G06K 9/00671* (2013.01); *G02B 2027/0187* (2013.01); *G06T 2219/024* (2013.01)

(58) Field of Classification Search
CPC ............ G06T 19/006; G06T 2219/024; G02B 27/017; G02B 2027/0187; G06F 3/011; G06F 3/017; G06K 9/00671
See application file for complete search history.

(56) References Cited

U.S. PATENT DOCUMENTS

| | | | | |
|---|---|---|---|---|
| 6,064,749 A | * | 5/2000 | Hirota | G06F 3/011 345/7 |
| 6,184,847 B1 | * | 2/2001 | Fateh | G06F 3/011 345/8 |
| 6,323,898 B1 | * | 11/2001 | Koyanagi | G01S 3/7864 348/169 |
| 7,742,623 B1 | * | 6/2010 | Moon | G06K 9/00228 382/103 |
| 8,947,322 B1 | * | 2/2015 | Chi | G06F 1/163 345/8 |
| 8,947,323 B1 | * | 2/2015 | Raffle | G09G 3/001 345/8 |
| 9,489,762 B2 | * | 11/2016 | Jenkins | G06T 15/00 |
| 9,520,002 B1 | * | 12/2016 | Gavriliuc | G02B 27/0103 |

(Continued)

*Primary Examiner* — Charles L Beard (57) ABSTRACT

A processing system of a mobile device may determine the device's predicted viewport, which defines a portion of a real world environment that is expected to be visible to the device's user at a future time. The processing system may determine a set of extended reality anchors that are present in the real world environment, where each anchor stores a digital object that, when rendered by the device and presented to the user simultaneously with the real world environment, creates extended reality media. The processing system may remove a first subset anchors from the set, where locations of anchors in the first subset fall outside a threshold distance from the predicted viewport. The removing results in a second subset of anchors remaining in the set. The processing system may download a digital object from a second device, where the digital object is stored by an anchor of the second subset.

20 Claims, 5 Drawing Sheets

(56) References Cited

U.S. PATENT DOCUMENTS

| | | | |
|---|---|---|---|
| 9,668,107 B2* | 5/2017 | Theimer | A63F 13/533 |
| 9,870,716 B1* | 1/2018 | Rao | G06F 1/1694 |
| 10,062,414 B1* | 8/2018 | Westphal | H04N 21/23406 |
| 10,142,496 B1* | 11/2018 | Rao | G06F 3/014 |
| 10,200,882 B1* | 2/2019 | Nelapati | H04W 76/10 |
| 10,416,755 B1* | 9/2019 | Erivantcev | G06F 3/0346 |
| 10,497,295 B1* | 12/2019 | Jia | G06F 3/011 |
| 10,520,742 B1* | 12/2019 | Sulai | G02B 27/0172 |
| 10,529,113 B1* | 1/2020 | Sheikh | G06K 9/00302 |
| 10,535,199 B1* | 1/2020 | Bond | G06T 15/08 |
| 10,559,019 B1* | 2/2020 | Beauvais | G06T 19/006 |
| 10,621,770 B1* | 4/2020 | Docking | G09B 29/106 |
| 10,623,791 B2* | 4/2020 | Han | H04N 5/23238 |
| 10,664,989 B1* | 5/2020 | Goslin | G06F 3/011 |
| 10,685,453 B1* | 6/2020 | Trail | H04N 5/2256 |
| 10,699,154 B2* | 6/2020 | Han | H04N 13/117 |
| 10,712,817 B1* | 7/2020 | Ronngren | G09G 5/37 |
| 10,732,707 B2* | 8/2020 | LaValle | G02B 27/017 |
| 10,735,882 B2* | 8/2020 | Han | G06F 3/0346 |
| 10,762,710 B2* | 9/2020 | Han | G06F 3/012 |
| 10,812,771 B1* | 10/2020 | Shi | G06T 3/0012 |
| 10,838,574 B2* | 11/2020 | Agarawala | G06F 3/04817 |
| 10,860,032 B2* | 12/2020 | Iyer | G06K 9/6292 |
| 10,871,825 B1* | 12/2020 | Sztuk | G06F 3/013 |
| 10,901,215 B1* | 1/2021 | Newcombe | G06T 19/006 |
| 10,909,405 B1* | 2/2021 | Golard | G06K 9/726 |
| 2003/0210228 A1* | 11/2003 | Ebersole | G06F 3/147 345/157 |
| 2005/0132420 A1* | 6/2005 | Howard | G10L 15/24 725/135 |
| 2007/0297695 A1* | 12/2007 | Aratani | G06T 7/73 382/284 |
| 2010/0268578 A1* | 10/2010 | Fushimi | G06Q 30/02 705/7.29 |
| 2010/0315505 A1* | 12/2010 | Michalke | G06T 7/251 348/118 |
| 2011/0305280 A1* | 12/2011 | Mochizuki | H04N 19/61 375/240.16 |
| 2012/0105473 A1* | 5/2012 | Bar-Zeev | G06T 7/70 345/633 |
| 2012/0242842 A1* | 9/2012 | Yoshigahara | G06K 9/22 348/207.1 |
| 2012/0249762 A1* | 10/2012 | Exner | G06F 3/0304 348/61 |
| 2012/0306909 A1* | 12/2012 | Mochizuki | G06F 3/0481 345/619 |
| 2013/0054377 A1* | 2/2013 | Krahnstoever | G09F 27/00 705/14.66 |
| 2013/0136304 A1* | 5/2013 | Anabuki | G06K 9/00362 382/103 |
| 2013/0215115 A1* | 8/2013 | Jenkins | G06T 19/003 345/420 |
| 2013/0230209 A1* | 9/2013 | Hashimoto | G06T 7/136 382/103 |
| 2013/0263016 A1* | 10/2013 | Lehtiniemi | G06F 3/04815 715/753 |
| 2013/0293577 A1* | 11/2013 | Perez | G06F 1/163 345/633 |
| 2013/0321586 A1* | 12/2013 | Kirk | G06T 17/00 348/47 |
| 2014/0160163 A1* | 6/2014 | Zhang | G06F 3/012 345/633 |
| 2014/0176591 A1* | 6/2014 | Klein | G09G 5/026 345/589 |
| 2014/0184550 A1* | 7/2014 | Hennessey | G06F 3/013 345/173 |
| 2014/0225919 A1* | 8/2014 | Kaino | H04N 7/183 345/633 |
| 2014/0267420 A1* | 9/2014 | Schowengerdt | G06F 3/011 345/633 |
| 2014/0300636 A1* | 10/2014 | Miyazaya | H04S 7/304 345/633 |
| 2014/0354515 A1* | 12/2014 | LaValle | G02B 27/017 345/8 |
| 2015/0029218 A1* | 1/2015 | Williams | G06T 19/006 345/633 |
| 2015/0172626 A1* | 6/2015 | Martini | G06K 9/46 348/50 |
| 2015/0235378 A1* | 8/2015 | Rhee | G06F 3/04815 345/633 |
| 2015/0261291 A1* | 9/2015 | Mikhailov | G06T 7/251 345/156 |
| 2015/0269770 A1* | 9/2015 | Jenkins | G06T 15/20 345/421 |
| 2015/0310665 A1* | 10/2015 | Michail | G06F 3/0346 345/419 |
| 2015/0331485 A1* | 11/2015 | Wilairat | G02B 27/0093 345/156 |
| 2015/0339856 A1* | 11/2015 | Imamura | H04N 5/23218 345/633 |
| 2015/0339858 A1* | 11/2015 | Nakamura | G06T 19/006 345/633 |
| 2015/0373274 A1* | 12/2015 | Kuwabara | G06T 19/006 345/633 |
| 2016/0035139 A1* | 2/2016 | Fuchs | G06T 7/60 345/633 |
| 2016/0042566 A1* | 2/2016 | Mao | A63F 13/825 463/32 |
| 2016/0048732 A1* | 2/2016 | Matoba | G06T 7/73 345/633 |
| 2016/0094944 A1* | 3/2016 | Kong | H04W 4/022 455/456.1 |
| 2016/0260251 A1* | 9/2016 | Stafford | G02B 27/0101 |
| 2016/0269631 A1* | 9/2016 | Jiang | G09B 5/02 |
| 2016/0309081 A1* | 10/2016 | Frahm | G06K 9/00604 |
| 2016/0328883 A1* | 11/2016 | Parfenov | G06T 13/00 |
| 2016/0364881 A1* | 12/2016 | Mallinson | G06F 3/015 |
| 2016/0371559 A1* | 12/2016 | Yang | G06T 7/73 |
| 2016/0371886 A1* | 12/2016 | Thompson | G06F 3/013 |
| 2017/0076499 A1* | 3/2017 | Jiang | G06T 7/00 |
| 2017/0115488 A1* | 4/2017 | Ambrus | G06T 11/60 |
| 2017/0169602 A1* | 6/2017 | Blackmon | G06T 15/06 |
| 2017/0180721 A1* | 6/2017 | Parker | H04N 13/341 |
| 2017/0213388 A1* | 7/2017 | Margolis | G09G 3/007 |
| 2017/0219710 A1* | 8/2017 | Schmidt | G01C 15/002 |
| 2017/0228878 A1* | 8/2017 | Goldman | G06T 7/75 |
| 2017/0256283 A1* | 9/2017 | Yajima | G11B 20/10527 |
| 2017/0278262 A1* | 9/2017 | Kawamoto | G06F 3/012 |
| 2017/0289219 A1* | 10/2017 | Khalid | G06F 3/00 |
| 2017/0295446 A1* | 10/2017 | Thagadur Shivappa | H04S 3/008 |
| 2017/0315608 A1* | 11/2017 | Shanware | G06F 3/0346 |
| 2017/0336862 A1* | 11/2017 | Xu | G06F 3/0346 |
| 2018/0005446 A1* | 1/2018 | Elazary | G06T 7/20 |
| 2018/0008141 A1* | 1/2018 | Krueger | A61B 5/11 |
| 2018/0020204 A1* | 1/2018 | Pang | H04N 13/194 |
| 2018/0041764 A1* | 2/2018 | Lin | H04N 19/105 |
| 2018/0045519 A1* | 2/2018 | Ghadiok | G06K 9/2054 |
| 2018/0046851 A1* | 2/2018 | Kienzle | G06F 3/013 |
| 2018/0061126 A1* | 3/2018 | Huang | G01S 5/0263 |
| 2018/0079427 A1* | 3/2018 | Herz | G06F 3/017 |
| 2018/0093177 A1* | 4/2018 | Tokubo | A63F 13/211 |
| 2018/0095616 A1* | 4/2018 | Valdivia | H04L 51/24 |
| 2018/0095636 A1* | 4/2018 | Valdivia | G06F 3/04815 |
| 2018/0096507 A1* | 4/2018 | Valdivia | G06F 3/011 |
| 2018/0108179 A1* | 4/2018 | Tomlin | G06F 3/0346 |
| 2018/0150971 A1* | 5/2018 | Adachi | G06T 7/74 |
| 2018/0150974 A1* | 5/2018 | Abe | G06K 9/6256 |
| 2018/0218538 A1* | 8/2018 | Short | G06T 19/006 |
| 2018/0232921 A1* | 8/2018 | Smith | G06Q 30/0201 |
| 2018/0253609 A1* | 9/2018 | Potter | B60Q 1/2603 |
| 2018/0253837 A1* | 9/2018 | Ghesu | G06T 7/75 |
| 2018/0286105 A1* | 10/2018 | Surti | H04N 13/344 |
| 2018/0300940 A1* | 10/2018 | Sakthivel | G06T 15/06 |
| 2018/0309927 A1* | 10/2018 | Tanner | G06F 3/011 |
| 2018/0321493 A1* | 11/2018 | Kim | G02B 27/0176 |
| 2018/0330544 A1* | 11/2018 | Corso | G06K 9/00671 |
| 2018/0364810 A1* | 12/2018 | Parshionikar | G06F 3/012 |
| 2018/0373328 A1* | 12/2018 | Sawaki | G06Q 30/0277 |
| 2019/0025586 A1* | 1/2019 | Sawaki | H04N 21/6581 |

(56) References Cited

U.S. PATENT DOCUMENTS

| | | | |
|---|---|---|---|
| 2019/0026864 A1* | 1/2019 | Chen | G06T 3/4046 |
| 2019/0058853 A1* | 2/2019 | Brudnak | G05D 1/0038 |
| 2019/0102656 A1* | 4/2019 | Kwant | G06K 9/623 |
| 2019/0102944 A1* | 4/2019 | Han | G06T 15/20 |
| 2019/0108652 A1* | 4/2019 | Linde | G06T 7/292 |
| 2019/0137294 A1* | 5/2019 | Jung | G06F 16/29 |
| 2019/0147619 A1* | 5/2019 | Goldman | B64C 39/024 |
| | | | 382/154 |
| 2019/0156145 A1* | 5/2019 | Pourian | G06T 7/0002 |
| 2019/0174082 A1* | 6/2019 | Taruki | H04N 5/23222 |
| 2019/0183576 A1* | 6/2019 | Fahim | A61N 1/3627 |
| 2019/0197321 A1* | 6/2019 | Hughes | G06K 9/00805 |
| 2019/0221191 A1* | 7/2019 | Chhipa | G09G 3/002 |
| 2019/0244407 A1* | 8/2019 | Wiesel | G06K 9/00369 |
| 2019/0244436 A1* | 8/2019 | Stansell | G06Q 30/0631 |
| 2019/0251719 A1* | 8/2019 | Wang | H04W 4/023 |
| 2019/0251892 A1* | 8/2019 | Stoll | A63F 13/212 |
| 2019/0258365 A1* | 8/2019 | Zurmoehle | G06F 3/04845 |
| 2019/0259139 A1* | 8/2019 | Ichihashi | G06T 7/579 |
| 2019/0268712 A1* | 8/2019 | Martin | H04W 4/027 |
| 2019/0278555 A1* | 9/2019 | Carvajal | G06F 3/0481 |
| 2019/0279383 A1* | 9/2019 | Angelova | G06N 3/08 |
| 2019/0286443 A1* | 9/2019 | Solomatnikov | G06F 9/3848 |
| 2019/0317974 A1* | 10/2019 | Chamberlin | G06F 16/58 |
| 2019/0335287 A1* | 10/2019 | Jung | G06F 3/167 |
| 2019/0339766 A1* | 11/2019 | Erivantcev | G06K 9/6271 |
| 2019/0362151 A1* | 11/2019 | Stokking | H04N 21/6371 |
| 2019/0362554 A1* | 11/2019 | Chen | G06F 3/04815 |
| 2019/0362557 A1* | 11/2019 | Lacey | G06T 19/006 |
| 2019/0369616 A1* | 12/2019 | Ostafew | G05D 1/0212 |
| 2019/0369752 A1* | 12/2019 | Ikeda | G02B 27/017 |
| 2019/0371065 A1* | 12/2019 | Anders | G06T 19/006 |
| 2019/0373391 A1* | 12/2019 | Han | G06F 3/011 |
| 2020/0012873 A1* | 1/2020 | Kim | B60W 50/14 |
| 2020/0027275 A1* | 1/2020 | Wan | G06F 3/016 |
| 2020/0033937 A1* | 1/2020 | Erivantcev | G06T 7/97 |
| 2020/0035203 A1* | 1/2020 | Kosik | G06F 3/015 |
| 2020/0043223 A1* | 2/2020 | Leiby | G06T 19/006 |
| 2020/0045285 A1* | 2/2020 | Varerkar | H04N 19/29 |
| 2020/0050884 A1* | 2/2020 | Han | H04N 5/23238 |
| 2020/0053292 A1* | 2/2020 | Janjic | G01S 19/49 |
| 2020/0053351 A1* | 2/2020 | Han | G06F 3/011 |
| 2020/0082576 A1* | 3/2020 | Lai | G06T 7/70 |
| 2020/0086487 A1* | 3/2020 | Johnson | B25J 9/1682 |
| 2020/0090575 A1* | 3/2020 | Martin | G09G 3/2092 |
| 2020/0129106 A1* | 4/2020 | Arbel | G06F 3/011 |
| 2020/0133300 A1* | 4/2020 | Iyer | G02B 27/0172 |
| 2020/0160057 A1* | 5/2020 | Roxas | G06F 3/167 |
| 2020/0167999 A1* | 5/2020 | Schmit | G06F 3/015 |
| 2020/0201045 A1* | 6/2020 | Liu | G02B 27/0172 |
| 2020/0226357 A1* | 7/2020 | Protter | G06T 7/277 |
| 2020/0249819 A1* | 8/2020 | Berquam | G06T 19/006 |
| 2020/0272148 A1* | 8/2020 | Karasev | G06K 9/00805 |
| 2020/0288164 A1* | 9/2020 | Lin | H04N 21/44218 |
| 2020/0312323 A1* | 10/2020 | Koshizen | G06N 3/006 |
| 2020/0314435 A1* | 10/2020 | Tourapis | G06T 9/001 |
| 2020/0319721 A1* | 10/2020 | Erivantcev | G06F 3/017 |
| 2020/0334836 A1* | 10/2020 | Lin | G06T 7/74 |
| 2020/0336668 A1* | 10/2020 | Hutsler | H04N 13/167 |
| 2020/0342231 A1* | 10/2020 | Richter | G06T 7/70 |
| 2020/0342672 A1* | 10/2020 | Schmelig | G06F 3/04842 |
| 2020/0357182 A1* | 11/2020 | Ahuja | G06K 9/00671 |
| 2020/0364290 A1* | 11/2020 | Bose | G06F 40/109 |
| 2020/0364901 A1* | 11/2020 | Choudhuri | G06T 7/75 |
| 2020/0368616 A1* | 11/2020 | Delamont | A63F 13/25 |
| 2020/0372678 A1* | 11/2020 | Farmer | G06T 7/77 |
| 2020/0372718 A1* | 11/2020 | Molyneaux | G06T 17/20 |
| 2020/0409457 A1* | 12/2020 | Terrano | G06F 3/013 |
| 2020/0412983 A1* | 12/2020 | Nakata | G06F 3/013 |
| 2021/0055545 A1* | 2/2021 | Rodgers | G06F 3/011 |
| 2021/0070322 A1* | 3/2021 | Noy | G06K 9/00805 |
| 2021/0097775 A1* | 4/2021 | Zurmoehle | G06F 3/016 |
| 2021/0132686 A1* | 5/2021 | Awaji | G02B 27/0093 |
| 2021/0158897 A1* | 5/2021 | Chatzou | G16B 40/20 |
| 2021/0165484 A1* | 6/2021 | Suguhara | G06F 3/013 |
| 2021/0209676 A1* | 7/2021 | Deol | G06N 20/00 |
| 2021/0350628 A1* | 11/2021 | Yanagisawa | G06Q 30/06 |

* cited by examiner

EXTENDED REALITY ANCHOR CACHING BASED ON VIEWPORT PREDICTION

The present disclosure relates generally to immersive visual streaming, and more particularly to devices, non-transitory computer-readable media, and methods for caching anchors in extended reality environments based on viewport prediction.

BACKGROUND

Extended reality (XR) is an umbrella term that has been used to refer to various different forms of immersive technologies, including virtual reality (VR), augmented reality (AR), mixed reality (MR), and cinematic reality (CR). Generally speaking, XR technologies allow virtual world (e.g., digital) objects to be brought into "real" (e.g., non-virtual) world environments and real world objects to be brought into virtual environments, e.g., via overlays or other mechanisms. XR technologies may have applications in fields including architecture, sports training, medicine, real estate, gaming, television and film, engineering, travel, and others. As such, immersive experiences that rely on XR technologies are growing in popularity.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

In one example, the present disclosure describes a device, computer-readable medium, and method for caching anchors in extended reality environments based on viewport prediction. In one example, a processing system of a mobile device including at least one processor may perform operations including determining a predicted viewport of the mobile device, wherein the predicted viewport defines a portion of a real world environment that is expected to be visible to a user of the mobile device at a future time, determining a set of extended reality anchors that are present in the real world environment, wherein each anchor of the extended reality anchors stores a digital object that, when rendered by the mobile device and presented to the user simultaneously with the real world environment, creates extended reality media, removing a first subset of the extended reality anchors from the set, wherein locations of anchors in the first subset of extended reality anchors fall outside of a threshold distance from a boundary of the predicted viewport, and wherein the removing results in a second subset of extended reality anchors remaining in the set, and downloading, by the processor, a digital object from a second device, wherein the digital object is stored by an anchor of the second subset of the extended reality anchors.

In another example, a non-transitory computer-readable medium stores instructions which, when executed by a processing system of a mobile device including at least one processor, cause the processing system to perform operations. The operations may include including determining a predicted viewport of the mobile device, wherein the predicted viewport defines a portion of a real world environment that is expected to be visible to a user of the mobile device at a future time, determining a set of extended reality anchors that are present in the real world environment, wherein each anchor of the extended reality anchors stores a digital object that, when rendered by the mobile device and presented to the user simultaneously with the real world environment, creates extended reality media, removing a first subset of the extended reality anchors from the set, wherein locations of anchors in the first subset of extended reality anchors fall outside of a threshold distance from a boundary of the predicted viewport, and wherein the removing results in a second subset of extended reality anchors remaining in the set, and downloading, by the processor, a digital object from a second device, wherein the digital object is stored by an anchor of the second subset of the extended reality anchors.

In another example, a processing system of a server in a telecommunications network, wherein the processing system includes at least one processor may perform operations including determining a predicted viewport of a mobile device in the telecommunications network, wherein the predicted viewport defines a portion of a real world environment that is expected to be visible to a user of the mobile device at a future time, determining a set of extended reality anchors that are present in the real world environment, wherein each anchor of the extended reality anchors stores a digital object that, when rendered by the mobile device and presented to the user simultaneously with the real world environment, creates extended reality media, removing a first subset of the extended reality anchors from the set, wherein locations of anchors in the first subset of extended reality anchors fall outside of a threshold distance from a boundary of the predicted viewport, and wherein the removing results in a second subset of extended reality anchors remaining in the set; and providing, subsequent to the removing, the set to the mobile device.

As discussed above, extended reality (XR) technologies allow virtual world (e.g., digital) objects to be brought into "real" (e.g., non-virtual) world environments and real world objects to be brought into virtual environments, e.g., via overlays or other mechanisms. In some examples, the system rendering the XR content (e.g., a head mounted display, a mobile phone, a tablet computer, smart glasses, or the like, hereinafter referred to as an "XR device") may rely on XR anchors to determine which digital objects should be rendered at which locations in the real world environment to produce the XR media. In some examples, the XR anchors may predefine precise locations in the real world environment at which certain types of digital objects may be introduced. The XR anchors may comprise beacons that are placed in the real world environment and that are detectable by the XR device. The XR anchors may also store the digital objects. When the XR device detects an XR anchor in a current image of a real world environment, the XR device may establish a connection (e.g., a communication channel) to the XR anchor and download the digital object from the XR anchor. Subsequently, the XR device may render the digital object so that the digital object appears in the XR environment, potentially in the same location as the XR anchor (or in another location that may be specified from metadata associated with the digital object).

XR anchors come in various types, including location-based anchors and marker-based anchors. In the case of location-based anchors, the location and orientation sensors of the XR device may detect, potentially in real time, the locations of the XR anchors. For instance, the XR anchors may be attached to or housed within objects that have known, fixed locations, such as buildings, statues, street signs, and the like.

Marker-based anchors may place unique markers (e.g., images, objects, or machine-readable codes, for example) on or near real world locations. A unique marker may indicate, when detected by an XR application, the presence of an XR anchor from which a digital object may be downloaded. For instance, specific locations may be defined in an outdoor space for virtual billboards, virtual traffic signs, or virtual street signs. These locations may be indicated by real billboards, traffic signs, or street signs. Similarly, an indoor space such as a museum may include specifically defined locations at which virtual information (e.g., descriptions, interactive content, or the like) relating to artifacts on display may be inserted. These locations may be indicated by unique images printed on a wall, a placard, or the like. As another example, a real world object such as a book may include pages or portions of pages at which educational animations or other content may be displayed. A machine-readable code may be printed on these pages to indicate that the digital objects can be superimposed over the pages.

Neither location-based nor marker-based anchors function perfectly, however. Location-based anchors rely on the precision of the XR device's location and orientation sensors, which may be insufficient to allow for rendering of digital objects in a manner that preserves the realism or accuracy of the XR media. For instance, if a user's mobile phone does not detect the user's location with sufficient precision, an XR application executing on the mobile phone may superimpose the name of the wrong street over an image of the user's current location. Both location-based and marker-based anchors can, when present in large numbers in a real world environment, lead to clutter in the XR environment. For instance, an XR application executing on a head mounted display may superimpose so many digital items over locations in the real world environment that the user has difficulty distinguishing between digital items or identifying the digital items in which he is actually interested. Moreover, the presence of a large number of marker-based anchors in a real world environment may slow the ability of the XR device to render the XR environment, as the XR device must detect and recognize each of the markers and download all of the corresponding digital objects before the digital objects can be rendered in the marked locations.

Examples of the present disclosure provide a viewport-guided scheme to caching XR anchors in visual streams, and, in particular, in XR visual streams (where the XR visual streams, in one example, comprise XR media that includes "real-world" elements, such as augmented reality, mixed reality, or cinematic reality). In many XR systems, a user can freely change his viewing direction with respect to the XR media being rendered, e.g., by changing the user's position and/or the XR device's position. For instance, where the XR device is a head mounted display, the user may change the viewing direction by turning his head. Where the XR device is a mobile phone or a tablet computer, the user may change the viewing direction by manually moving the mobile phone or tablet computer. The user's viewport (visible area) is determined by the viewing direction (in latitude/longitude) and the field-of-view (FoV) of the XR device, e.g., in real time or near-real time. The FoV defines the extent of the observable area, which may be a fixed parameter of the XR device.

The viewport-guided XR anchor caching of the present disclosure predicts a user's viewport, e.g., what portion of the real world environment will be visible on the display of the XR device, at a given point in the future (e.g., a few seconds from the current time). In one example, there are six degrees of freedom in defining the viewport: three axes of position (e.g., x, y, and z coordinates of the XR device in the real world) and three dimensions of viewing direction (e.g., yaw, pitch, and roll of the XR device). Once the viewport is predicted, the XR anchors that are present in the viewport (or within some configurable distance from the viewport's boundary) can be identified, as well as the digital objects that are associated with the XR anchors. This allows XR anchors that may be nearby, but are not actually present in the predicted viewport (or within the configurable distance from the viewport's boundary) to be filtered out, or removed from consideration, when determining which digital objects to download and cache. Optionally, the digital objects can be further filtered according to user preferences, e.g., so that digital objects in which the user is not expected to be interested can be filtered out. Then, digital objects which are not filtered out may be downloaded and cached by the XR device for display when the associated XR anchors appear in the viewport. Thus, device and network resources can be conserved by not downloading digital content that is not expected to be visible to or of interest to the user. The user experience may also be improved by reducing clutter (e.g., reducing the number of digital objects presented to the user) and providing a more personalized experience.

In one example, the viewport-guided XR anchor caching may be performed entirely by the XR device, if the XR device has sufficient processing power and memory space to perform the operations. In another example, e.g., where the processing power and/or memory space of the XR device may be more limited, one or more of the operations may be performed by other devices in cooperation with the XR device.

For instance, in one example, one or more operations for viewport-guided XR anchor caching is applied at the network-edge, e.g., in an edge server. To illustrate, in one example, the edge server may collect the viewport movement traces from an XR device periodically, or according to another schedule. At the XR device-side, the video player may collect actual viewport data, e.g., via motion sensors for 360-degree video streaming or volumetric video streaming, or using gaze tracking for regular video streaming or non-360-degree panoramic video streaming. Upon obtaining the viewport traces, the edge server may use one or more pre-trained machine learning models (MLMs) to predict the future viewports and trajectory (e.g., which direction the viewport is moving toward).

In another example, one or more operations for viewport-guided XR anchor caching may be performed by an application server in a telecommunications network (e.g., in the cloud). For instance, the operations discussed above in connection with the edge server may be performed by the application server. These and other aspects of the present disclosure are described in greater detail below in connection with the examples of FIGS. 1-5.

Figure 1:
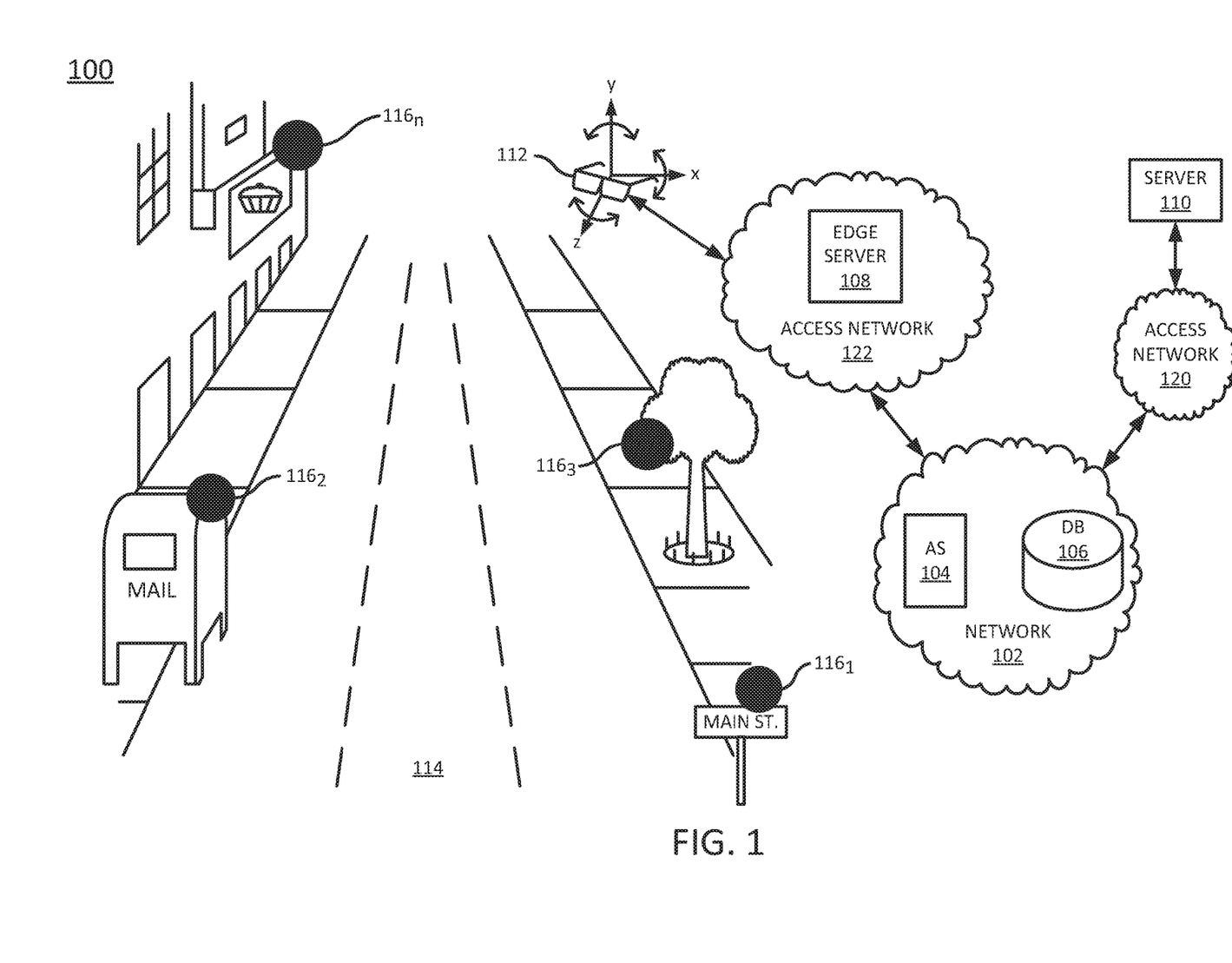
FIG. 1 illustrates an example network related to the present disclosure.

To further aid in understanding the present disclosure, FIG. 1 illustrates an example system 100 in which examples of the present disclosure may operate. The system 100 may include any one or more types of communication networks, such as a traditional circuit switched network (e.g., a public switched telephone network (PSTN)) or a packet network such as an Internet Protocol (IP) network (e.g., an IP Multimedia Subsystem (IMS) network), an asynchronous transfer mode (ATM) network, a wireless network, a cellular network (e.g., 2G, 3G, and the like), a long term evolution (LTE) network, 5G and the like related to the current disclosure. It should be noted that an IP network is broadly defined as a network that uses Internet Protocol to exchange data packets. Additional example IP networks include Voice over IP (VoIP) networks, Service over IP (SoIP) networks, and the like.

In one example, the system 100 may comprise a network 102, e.g., a telecommunication service provider network, a core network, or an enterprise network comprising infrastructure for computing and communications services of a business, an educational institution, a governmental service, or other enterprises. The network 102 may be in communication with one or more access networks 120 and 122, and the Internet (not shown). In one example, network 102 may combine core network components of a cellular network with components of a triple play service network; where triple-play services include telephone services, Internet or data services and television services to subscribers. For example, network 102 may functionally comprise a fixed mobile convergence (FMC) network, e.g., an IP Multimedia Subsystem (IMS) network. In addition, network 102 may functionally comprise a telephony network, e.g., an Internet Protocol/Multi-Protocol Label Switching (IP/MPLS) backbone network utilizing Session Initiation Protocol (SIP) for circuit-switched and Voice over internet Protocol (VoIP) telephony services. Network 102 may further comprise a broadcast television network, e.g., a traditional cable provider network or an internet Protocol Television (IPTV) network, as well as an Internet Service Provider (ISP) network. In one example, network 102 may include a plurality of television (TV) servers (e.g., a broadcast server, a cable head-end), a plurality of content servers, an advertising server (AS), an interactive TV/video on demand (VoD) server, and so forth.

In one example, the access networks 120 and 122 may comprise broadband optical and/or cable access networks, Local Area Networks (LANs), wireless access networks (e.g., an IEEE 802.11/Wi-Fi network and the like), cellular access networks, Digital Subscriber Line (DSL) networks, public switched telephone network (PSTN) access networks, 3$^{rd}$ party networks, and the like. For example, the operator of network 102 may provide a cable television service, an IPTV service, or any other types of telecommunication service to subscribers via access networks 120 and 122. In one example, the access networks 120 and 122 may comprise different types of access networks, may comprise the same type of access network, or some access networks may be the same type of access network and other may be different types of access networks. In one example, the network 102 may be operated by a telecommunication network service provider. The network 102 and the access networks 120 and 122 may be operated by different service providers, the same service provider or a combination thereof, or may be operated by entities having core businesses that are not related to telecommunications services, e.g., corporate, governmental or educational institution LANs, and the like.

Figure 5:
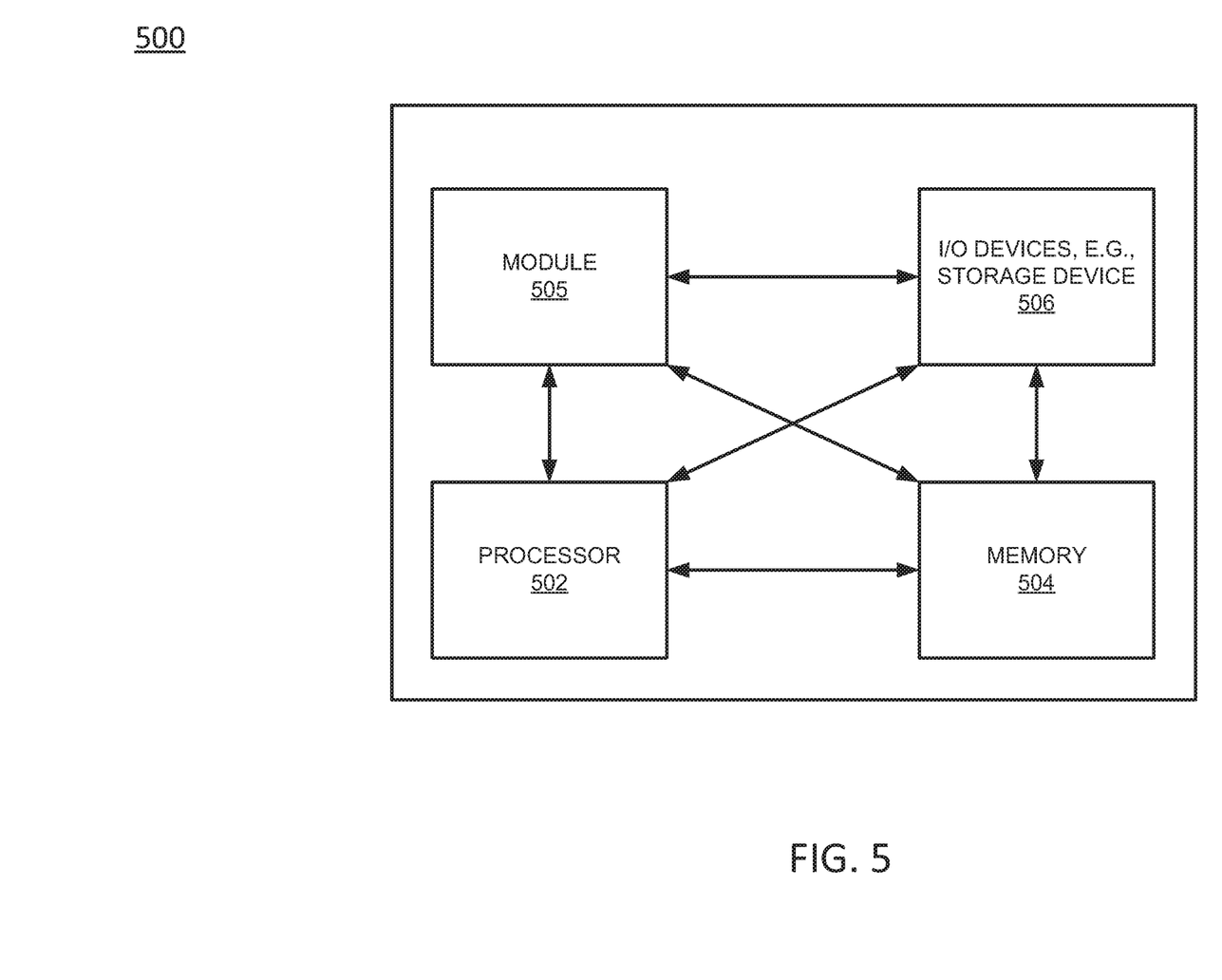
FIG. 5 illustrates a high level block diagram of a computing device specifically programmed to perform the steps, functions, blocks and/or operations described herein.

In accordance with the present disclosure, network 102 may include an application server (AS) 104, which may comprise a computing system or server, such as computing system 500 depicted in FIG. 5, and may be configured to provide one or more operations or functions in connection with examples of the present disclosure for anchor caching for extended reality applications. The network 102 may also include a database (DB) 106 that is communicatively coupled to the AS 104.

It should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 5 and discussed below) or multiple computing devices collectively configured to perform various steps, functions, and/or operations in accordance with the present disclosure. Thus, although only a single application server (AS) 104 and single database (DB) are illustrated, it should be noted that any number of servers may be deployed, and which may operate in a distributed and/or coordinated manner as a processing system to perform operations in connection with the present disclosure.

In one example, AS 104 may comprise a centralized network-based server for generating extended reality media. For instance, the AS 104 may host an application that predicts a future viewport of an XR device, identifies a set of XR anchors that are present within the future viewport and digital objects associated with the XR anchors, filters the set of XR anchors based on user preferences, and/or transmits digital objects associated with at least some of the XR anchors to the XR device in accordance with the present disclosure. In one example, AS 104 may comprise a physical storage device (e.g., a database server), to store copies of digital objects that may also be stored at XR anchors, as discussed in greater detail below. Additionally, the AS 104 may store an index, where the index maps each XR anchor of a plurality of anchors to a respective digital object that is stored at the XR anchor. In one example, the index may further map each XR anchor to a respective location in the real world environment (e.g., latitude and longitude, global positioning system coordinates, etc.). In one example, more than one digital object may be stored at the same XR anchor, and the AS 104 may select from among the more than one digital object based on user preferences. For instance, the XR anchor may comprise a marker on a billboard in the real world environment, and the digital objects stored at the XR anchor may include a plurality of different advertisements that can be rendered in the place of the billboard. In this case, a specific advertisement that is best targeted to the user's preferences may be selected for rendering.

In a further example, the AS 104 may also store user profiles which may specify user preferences that can be used to filter a set of XR anchors. For instance, in one example, a user profile may specify, for each user: demographic information (e.g., age, gender, marital status, education, etc.), device information (e.g., whether the user uses a head mounted display, a mobile phone, a tablet computer, or the like to render and display XR media, the types of connections used by the device to access XR media such as cellular or WiFi, etc.), interests (e.g., favorite hobbies, sports teams, music, movies, etc.), and/or usage history with respect to XR media (e.g., types of digital objects the user has interacted with and/or ignored in the past).

A user profile may also indicate the user's current use context with respect to an XR device (e.g., how quickly the user is moving, how frequently the user's gaze or viewport appears to change, whether the user in indoors or outdoors, or the like). The current use context may be inferred from data collected by sensors of the XR device. For instance, an accelerometer, a thermometer, A user profile may also specify restrictions on the types of digital objects that may be rendered for the user. For instance, a parent may configure a child's profile so that digital objects which may be considered too violent or too scary are prohibited from being rendered. In one example, profiles may be stored on an opt-in basis, i.e., a user may elect to not have a profile. In a further example, the user profiles may be stored in encrypted form to protect any user information that may be deemed private.

In one example, the DB 106 may store the digital objects, the index, and/or the user profiles, and the AS 104 may retrieve the digital objects, the index, and/or user profiles from the DB 106 when needed. For ease of illustration, various additional elements of network 102 are omitted from FIG. 1.

Figure 3:
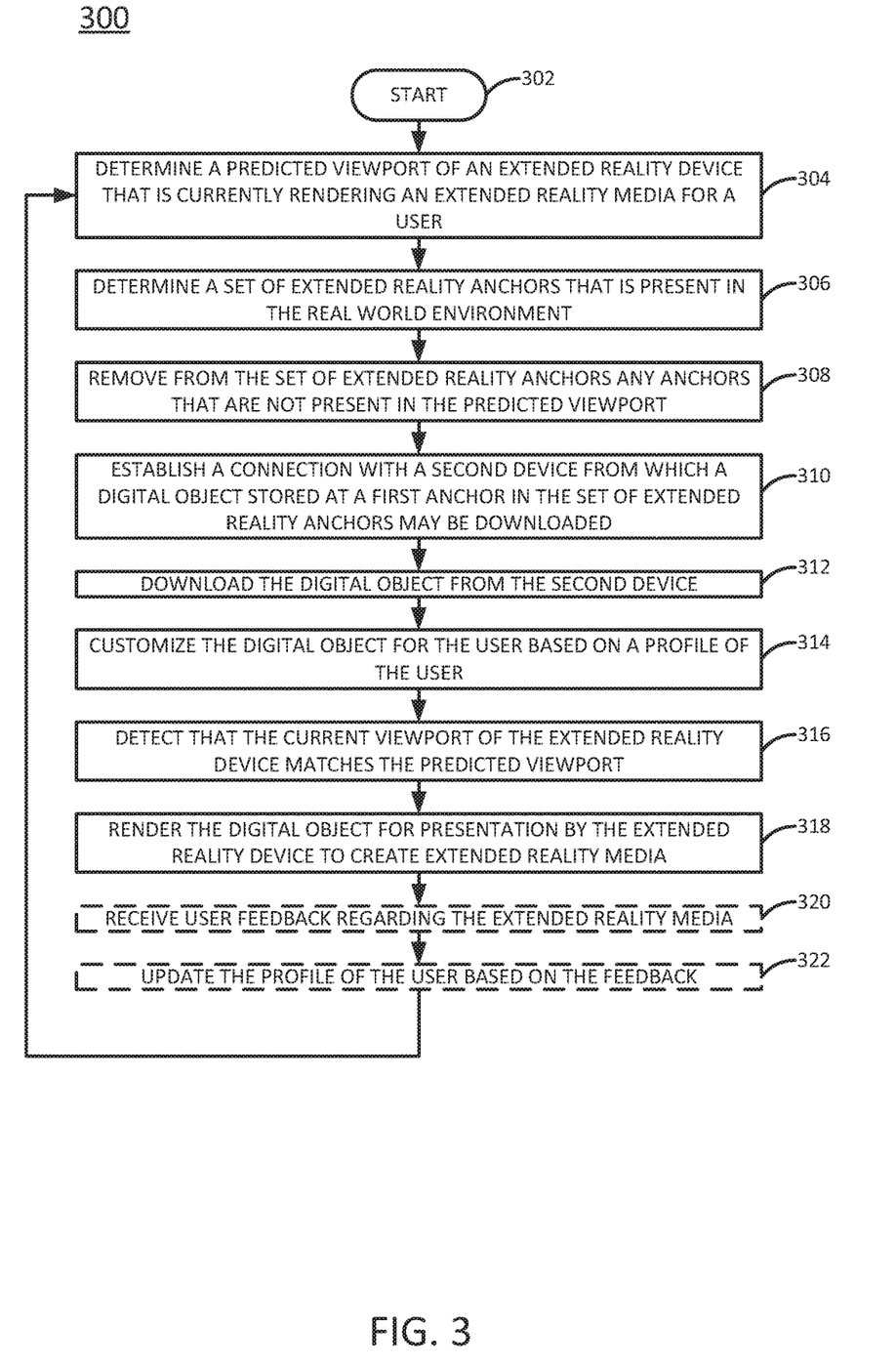
FIG. 3 illustrates a flowchart of an example method for rendering an extended reality environment, in accordance with the present disclosure.

In one example, access network 122 may include an edge server 108, which may comprise a computing system or server, such as computing system 500 depicted in FIG. 5, and may be configured to provide one or more operations or functions for anchor caching for extended reality applications, as described herein. For instance, an example method 300 for viewport-based anchor caching for extended reality applications is illustrated in FIG. 3 and described in greater detail below.

In one example, application server 104 may comprise a network function virtualization infrastructure (NFVI), e.g., one or more devices or servers that are available as host devices to host virtual machines (VMs), containers, or the like comprising virtual network functions (VNFs). In other words, at least a portion of the network 102 may incorporate software-defined network (SDN) components. Similarly, in one example, access networks 120 and 122 may comprise "edge clouds," which may include a plurality of nodes/host devices, e.g., computing resources comprising processors, e.g., central processing units (CPUs), graphics processing units (GPUs), programmable logic devices (PLDs), such as field programmable gate arrays (FPGAs), or the like, memory, storage, and so forth. In an example where the access network 122 comprises radio access networks, the nodes and other components of the access network 122 may be referred to as a mobile edge infrastructure. As just one example, edge server 108 may be instantiated on one or more servers hosting virtualization platforms for managing one or more virtual machines (VMs), containers, microservices, or the like. In other words, in one example, edge server 108 may comprise a VM, a container, or the like.

In one example, the access network 120 may be in communication with a server 110. Similarly, access network 122 may be in communication with one or more devices, e.g., device 112. Access networks 120 and 122 may transmit and receive communications between server 110, device 112, application server (AS) 104, other components of network 102, devices reachable via the Internet in general, and so forth. In one example, device 112 may comprise a mobile device, a cellular smart phone, a wearable computing device (e.g., smart glasses, a virtual reality (VR) headset or other type of head mounted display, or the like), a laptop computer, a tablet computer, or the like (broadly an "XR device"). In one example, device 112 may comprise a computing system or device, such as computing system 500 depicted in FIG. 5, and may be configured to provide one or more operations or functions in connection with examples of the present disclosure for anchor caching for extended reality applications.

In one example, server 110 may comprise a network-based server for generating XR media. In this regard, server 110 may comprise the same or similar components as those of AS 104 and may provide the same or similar functions. Thus, any examples described herein with respect to AS 104 may similarly apply to server 110, and vice versa. In particular, server 110 may be a component of an XR system operated by an entity that is not a telecommunications network operator. For instance, a provider of an XR system may operate server 110 and may also operate edge sever 108 in accordance with an arrangement with a telecommunication service provider offering edge computing resources to third-parties. However, in another example, a telecommunication network service provider may operate network 102 and access network 122, and may also provide an XR system via AS 104 and edge server 108. For instance, in such an example, the XR system may comprise an additional service that may be offered to subscribers, e.g., in addition to network access services, telephony services, traditional television services, and so forth.

In an illustrative example, an XR system may be provided via AS 104 and edge server 108. In one example, a user may engage an application on device 112 (e.g., an "XR device") to establish one or more sessions with the XR system, e.g., a connection to edge server 108 (or a connection to edge server 108 and a connection to AS 104). In one example, the access network 122 may comprise a cellular network (e.g., a 4G network and/or an LTE network, or a portion thereof, such as an evolved Uniform Terrestrial Radio Access Network (eUTRAN), an evolved packet core (EPC) network, etc., a 5G network, etc.). Thus, the communications between device 112 and edge server 108 may involve cellular communication via one or more base stations (e.g., eNodeBs, gNBs, or the like). However, in another example, the communications may alternatively or additional be via a non-cellular wireless communication modality, such as IEEE 802.11/Wi-Fi, or the like. For instance, access network 122 may comprise a wireless local area network (WLAN) containing at least one wireless access point (AP), e.g., a wireless router. Alternatively, or in addition, device 112 may communicate with access network 122, network 102, the Internet in general, etc., via a WLAN that interfaces with access network 122.

In the example of FIG. 1, device 112 may establish a session with edge server 108 for obtaining an XR media. For illustrative purposes, the XR media may insert one or more digital objects into a real-time image stream of a real world scene. In this regard, an example real world scene 114 is illustrated in FIG. 1.

In one example, the real world scene 114 may be viewed by a user through the device 112, e.g., on a display of a head mounted display or mobile phone, or through a set of smart glasses. As discussed above, the field of view of the device 112 and the viewing direction together define a viewport of the user. As the viewport changes, the device 112 (or alternatively the AS 104, edge server 108, or server 110) may detect one or more XR anchors $116_1$-$116_n$ (hereinafter individually referred to as an "XR anchor 116" or collectively referred to as "XR anchors 116") within the viewport. In one example, some of the XR anchors 116 may be placed in known, fixed locations (such as buildings, statues, street signs, or the like). In other examples, some of the XR anchors 116 may emit signals (e.g., Bluetooth, infrared, or electromagnetic signals) that are detectable by the device 112, where the signals indicate the presence of the XR anchors 116. In one example, the XR anchors 116 may comprise a combination of XR anchors that are placed in known, fixed locations and XR anchors that emit signals to facilitate their detection.

For instance, the example real world scene 114 of FIG. 1 depicts a city street in which the XR anchors 116 may include or be co-located with a street sign ($116_1$), a mailbox ($116_2$), a tree ($116_3$), and a billboard ($116_n$). The locations of the street sign and the billboard may be fixed, and, therefore known to the device 112, AS 104, and/or edge server 108 as anchor locations. On the other hand, the locations of the mailbox and the tree may be considered less permanent, and, therefore, the XR anchors $116_2$ and $116_3$ associated with the mailbox and the tree may emit signals to alert other devices to their presence.

As discussed above, each of the XR anchors 116 may store at least one digital object, where the digital object may be downloaded and subsequently inserted, by the device 112, into the real world scene 114. For instance, if the XR anchor $116_n$ on the billboard is detected by the device 112, the device 112 may download an image from the XR anchor $116_1$ that may be displayed on the billboard. Alternatively, if the XR anchor $116_3$ on the tree is detected, the device 112 may download a digital animation of a bird from the XR anchor $116_3$, where the animation may be inserted in the branches of the tree in the XR environment.

In one example, the digital objects stored at the XR anchors 116 may include video files, advertisements, animation files, image files, or the like. In further examples, the digital objects may include computing resources (e.g., processing, memory, or the like). In a further example, each digital object may include descriptive metadata which may help a device to determine whether or not to download the digital object. For instance, the descriptive metadata may specify a type of the content (e.g., file type), a language of the content, a genre of the content (e.g., advertisement, information, entertainment, etc.), or the like. Additionally, each digital object may include metadata which may indicate rules associated with the use of the digital object. For instance, the metadata may specify for how long a device that downloads the digital object is permitted to store the digital object, a maximum number of times that the same device is permitted to download the digital object, specific locations at which the digital object is permitted to be rendered or not rendered, or the like.

According to examples of the present disclosure, the viewport of the user may be predicted in advance (e.g., x seconds before the user actually views the viewport). The XR device (e.g., device 112, or a server connected to the XR device) may have prior knowledge of the locations of at least some of the XR anchors 116 in the real world environment and may be able to detect the presence of other XR anchors 116. Thus, the XR device (or the server) may be able to determine, based on the predicted viewport, which of the XR anchors 116 (or which objects associated with the XR anchors 116) are likely to be visible by the user.

Figure 2:
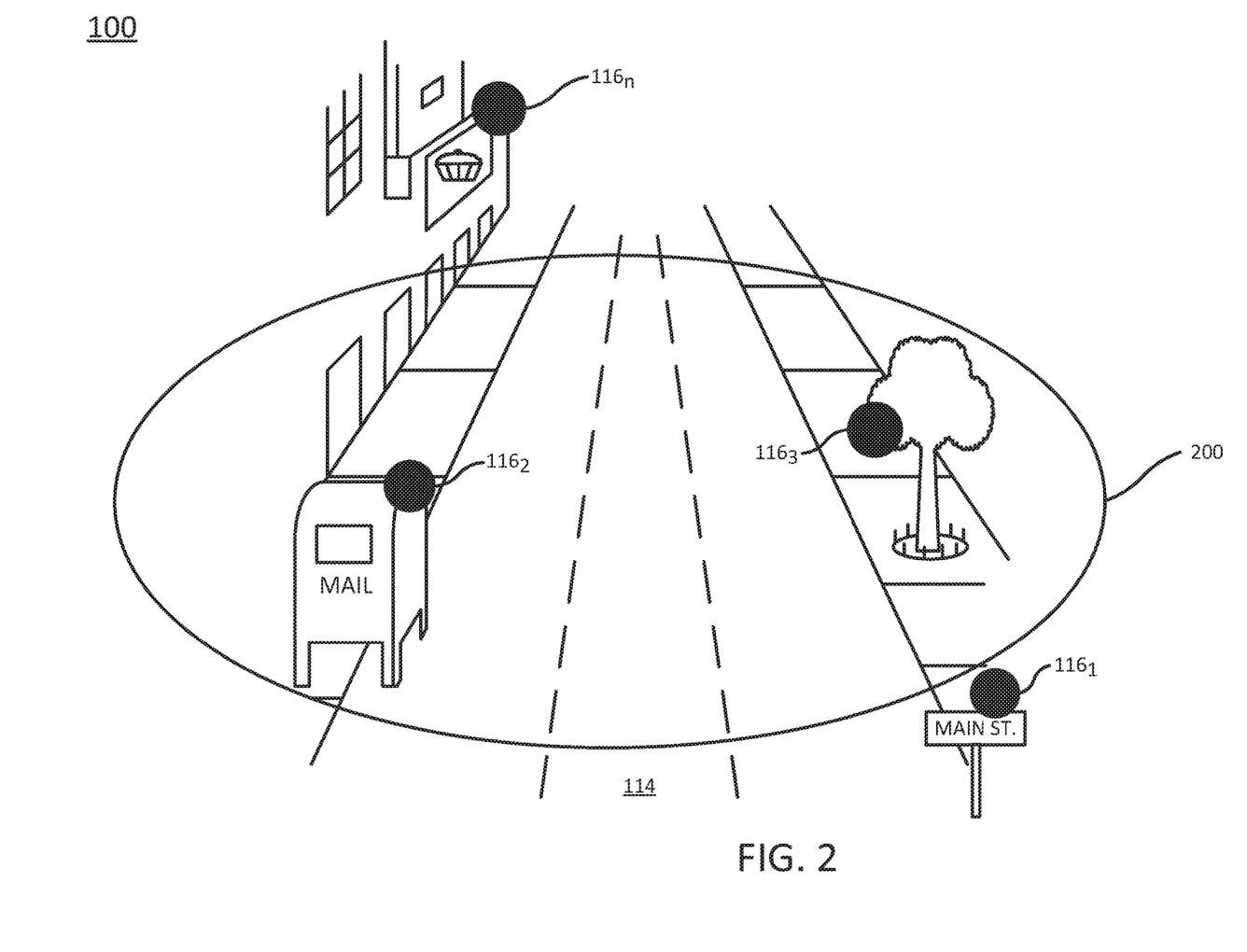
FIG. 2 illustrates an example viewport for an extended reality device that is viewing the real world scene of FIG. 1.

For instance, FIG. 2 illustrates an example viewport 200 for an XR device that is viewing the real world scene 114 of FIG. 1. As illustrated, based on the viewing direction and on the FoV of the XR device, the viewport 200 may comprise less than the entirety of the real world scene 114. As such, only some of the XR anchors 116 (or their associated objects or markers) may be visible within the viewport 200. For instance, in the example illustrated in FIG. 2, the XR anchors $116_2$ and $116_3$ are visible within the viewport 200, while the XR anchors $116_1$ and $116_n$ fall outside of the viewport. As such, if the XR device predicts that the viewport 200 will be visible to the user in x seconds, and if the XR device knows or can detect the locations of the XR anchors 116, then the XR device can determine that the XR anchors $116_2$ and $116_3$ are likely to be visible to the user in x seconds.

Referring back to FIG. 1, the device 112 may comprise a wearable device or a non-wearable device which may include sensors for determining yaw, pitch, and roll parameters of the device 112. In one example, the device 112 may translate the yaw, pitch, and roll parameters into a viewport such as the viewport 200.

In another example, the predicted viewport is calculated by the edge server 108. To illustrate, the edge server 108 may obtain viewport traces from device 112. For instance, device 112 may periodically send actual measured viewport information (e.g., recent viewport information) to edge server 108, such as yaw, pitch, and roll measurements, and in some cases device location and/or camera position information, FoV information, and so forth. Edge server 108 may then use the recent viewport information to calculate the predicted viewport at some time in the near future (e.g., x seconds into the future). In one example, the recent viewport information (which may be referred to as a "viewport trace"), may be processed via a trained machine learning algorithm (MLA), e.g., a MLM, to output a predicted viewport. For instance, the recent viewport information may indicate a trajectory of the viewport in a general direction. It may be expected that the viewport movement is likely to continue in the same general direction as indicated by the trajectory, which may be quantified by the output of the MLM, i.e., the predicted viewport.

In another example, the predicted viewport may be further based upon analysis of a heatmap and/or saliency map. For instance, AS 104 may provide heatmap information, e.g., an identification of a region or regions of the real world scene 114 that are most popular among prior users. For instance, the real world scene may include a famous landmark or a famous work of art. Similarly, AS 104 may provide saliency map information, e.g., identification of a region or regions of the real world scene 114 that are determined to be the most "salient" according to an image saliency detection algorithm (e.g., as applied to individual frames or a plurality of frames of streaming images of the real world location 114). In one example, edge server 108 (and other edge servers, if present, in the immersive visual streaming system) may utilize viewport traces to perform viewport prediction, and may also provide the viewport traces to AS 104 for aggregation and developing heatmaps for images of the real world scene 114. The saliency map information and heatmap information may be stored along with images of the real world environment 114. The saliency map and/or heatmap-identified region or regions can then be used in conjunction with a user's viewport trajectory to further increase the accuracy of future viewport prediction. In one example, the saliency map and/or heatmap information may comprise additional inputs into a MLM for viewport prediction. In another example, a predicted viewport may be generated via the MLM and combined with the saliency map and/or heatmap information to modify the predicted viewport, e.g., to move a center of the predicted viewport toward a region or regions of the frame that are identified in the saliency map and/or heatmap information.

It should also be noted that the system 100 has been simplified. Thus, it should be noted that the system 100 may be implemented in a different form than that which is illustrated in FIG. 1, or may be expanded by including additional endpoint devices, access networks, network elements, application servers, etc. without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements. For example, the system 100 may include other network elements (not shown) such as border elements, routers, switches, policy servers, security devices, gateways, a content distribution network (CDN) and the like. For example, portions of network 102, access networks 120 and 122, and/or Internet may comprise a content distribution network (CDN) having ingest servers, edge servers, and the like for packet-based streaming of video, audio, or other content. Similarly, although only two access networks, 120 and 122 are shown, in other examples, access networks 120 and/or 122 may each comprise a plurality of different access networks that may interface with network 102 independently or in a chained manner. In addition, as described above, the functions of AS 104 may be similarly provided by server 110, or may be provided by AS 104 in conjunction with server 110. For instance, AS 104 and server 110 may be configured in a load balancing arrangement, or may be configured to provide for backups or redundancies with respect to each other, and so forth. Thus, these and other modifications are all contemplated within the scope of the present disclosure.

FIG. 3 illustrates a flowchart of an example method 300 for rendering an extended reality environment, in accordance with the present disclosure. In one example, the method 300 is performed by a component of the system 100 of FIG. 1, such as by the device 112, and/or any one or more components thereof (e.g., a processor, or processors, performing operations stored in and loaded from a memory), or by the device 112 in conjunction with one or more other devices, such AS 104, server 106, edge server 108, and so on. In one example, the steps, functions, or operations of method 300 may be performed by a computing device or system 500, and/or processor 502 as described in connection with FIG. 5 below. For instance, the computing device or system 500 may represent any one or more components of the system 100 of FIG. 1 that is/are configured to perform the steps, functions and/or operations of the method 300. Similarly, in one example, the steps, functions, or operations of method 300 may be performed by a processing system comprising one or more computing devices collectively configured to perform various steps, functions, and/or operations of the method 300. For instance, multiple instances of the computing device or processing system 500 may collectively function as a processing system. For illustrative purposes, the method 300 is described in greater detail below in connection with an example performed by a processing system.

The method 300 begins in step 302 and may proceed to step 304. In step 304, the processing system may determine a predicted viewport of an XR device that is currently rendering an XR media for a user. As discussed above, the predicted viewport may comprise a viewport that is expected to be visible to the user of the XR device at some time in the near future (e.g., in x seconds). The predicted viewport may be determined by the FoV of the XR device and the expected viewing direction of the XR device at the time in the near future. As discussed above, the FoV remains fixed (e.g., the width and height of the FoV do not change), but the expected viewing direction may be determined with six degrees of freedom. In one example, these six degrees of freedom include three axes of position (e.g., x, y, and z coordinates of the XR device in the real world) and three dimensions of viewing direction (e.g., yaw, pitch, and roll of the XR device). The axes of position and/or dimensions of viewing direction may be determined from GPS or similar sensors of the XR device, from an inertial measurement unit or similar sensor of the XR device, and/or from a compass or similar sensor of the XR device.

In one example, the predicted viewport may be predicted based on viewport traces of the XR device. For instance, the predicted viewport may be predicted using an MLM that analyzes the parameters of recent viewports of the XR device in order to determine where the predicted viewport is likely to be. The parameters of the recent viewports may include yaw, pitch, and roll measurements, and in some cases device location and/or camera position information, FoV information, and so forth. For instance, the recent viewport information may indicate a trajectory of the viewport in a general direction. It may be expected that the viewport movement is likely to continue in the same general direction as indicated by the trajectory, which may be quantified by the output of the MLM, i.e., the predicted viewport. In one example, the MLM may comprise a multi-scale time prediction model. The multi-scale time prediction model may use short-term predictions (e.g., regression) to predict the predicted viewport based on the orientation of the XR device, as well as long term predictions to predict the predicted viewport based on historical behavior of the user while using the XR device. In a further example, the multi-scale time prediction model may derive a long-term user behavior model from a user profile that describes the user's interests, cached objects, and the like. In other words, the long-term user behavior model may identify the types of items or digital objects that the user tends to look at or interact with.

In one example, if the XR device has sufficient resources (e.g., processing and/or memory), the XR device may execute the MLM to determine the predicted viewport. In this case, step 304 may involve generating the predicted viewport. However, in another example, the XR device may periodically send the parameters of the recent viewports to a remote device, such as a server in a telecommunications network (e.g., an application server, an edge server, or the like), and the remote device may execute the MLM to determine the predicted viewport. In this case, step 304 may involve receiving the predicted viewport from the remote device.

In step 306, the processing system may determine a set of XR anchors that is present in the real world environment surrounding the XR device. As discussed above, the XR anchors may comprise beacons that are associated with locations or objects (e.g., IoT devices) in the real world environment. The XR anchors may store the digital objects, such as video files, advertisements, animation files, image files, or the like, which may be rendered by the XR device. When the digital objects are rendered by the XR device in a manner that allows the digital objects to be viewed simultaneously with the real world environment, an XR media is created.

In step 308, the processing system may remove, from the set of XR anchors, a first subset of anchors including any anchors that are not present in (or are not within some configurable distance from the boundary of) the predicted viewport. This step leaves a second subset of anchors remaining in the set, where the second subset of anchors includes anchors that are present in (or are within the configurable distance from the boundary of) the predicted viewport. In some examples, the real world environment may contain tens, hundreds, or even thousands of XR anchors, but only a small subset of these XR anchors may be present or near in the predicted viewport. Thus, by removing from the set of XR anchors those anchors that are not actually present in the predicted viewport (or are not within the configurable distance from the viewport's boundary), the number of digital objects that may potentially be downloaded by the XR device in later steps of the method 300 can be greatly reduced (e.g., digital objects which may be irrelevant due to their distance from the predicted viewport may not be considered for download). This will ultimately improve the computational efficiency and accuracy of the method 300.

In one example, the locations of at least some of the XR anchors are known in advance. For instance, an index may map XR anchors to specific locations (e.g., latitude and longitude) in the real world environment, where the XR anchors may be fixed at those locations. In another example, an XR anchor that comprises an IoT device may emit a signal (e.g., a Bluetooth, infrared, or electromagnetic signal) that can be detected by the processing system, where the signal either identifies the location of the XR anchor or allows the processing system to determine the location through further analysis of the signal.

In step 310, the processing system may establish a connection with a second device from which a digital object stored at at least one anchor of the set of XR anchors (determined in step 306) may be downloaded. In one example, the connection may be established using anonymous but trusted identifiers (e.g., hardware hashes, blockchain tokens, or the like) to indicate the physical position of the second device and/or the digital object. In one example, the second device is the XR anchor at which the digital object is stored. In another example, second device is another device in the vicinity of the processing system, which may have previously cached the digital object from the associated XR anchor (e.g., another XR device being operated by another user), or an edge server which may have previously cached the digital object. Where the second device is the XR anchor or another user endpoint device, the connection established by the processing system may be a direct (e.g., peer-to-peer or mesh) connection.

In step 312, the processing system may download the digital object from the second device. In one example, the processing system may store the digital object, in its entirety, in a memory (e.g., cache) of the XR device. In another example, the processing system may temporarily store portions or chunks of the digital object in the memory of the XR device, e.g., where the processing system may stream the digital object from the second device.

In step 314, the processing system may customize the digital object for the user. As discussed above, the user's profile may specify information about the user, including demographic information (e.g., age, gender, marital status, education, etc.), device information (e.g., whether the user uses a head mounted display, a mobile phone, a tablet computer, or the like to render and display XR media, the types of connections used by the device to access XR media such as cellular or WiFi, etc.), interests (e.g., favorite hobbies, sports teams, music, movies, etc.), and/or usage history with respect to XR media (e.g., types of digital objects the user has interacted with and/or ignored in the past). This information may be used to customize the XR environment, and more specifically individual digital objects which may be rendered in the XR environment, for the user. For instance, if a digital object includes a logo for a football team, then the logo included in the digital object may be customized as the logo of the user's favorite football team. As another example, if the digital object includes text, and the user's vision is known to be poor, then the size and/or font of the text could be increased to improve visibility. Similarly, the language of the text could be adapted to the user's preferred language. For digital objects that include sound, visual cues related to the sound (e.g., closed captioning) could be provided to a user who is hard of hearing.

In further examples, where the processing system is able to infer the user's current use context with respect to the XR device (e.g., based on data collected by sensors of the XR device), the processing system may further customize the digital object to the current use context. For instance, the processing system may be able to infer (e.g., based on sentiment analysis of statements made by the user, based on the user's current walking speed, based on knowledge of the user's schedule as obtained from a profile, or the like) that the user is currently in a hurry. In this case, the processing system may elect to render an abbreviated version of the digital content as opposed to a longer, more complete version. For example, if the digital content comprises a video, the processing system may render a shortened version of the video.

Additionally, digital objects that include advertising material may be customized for the user. For instance, a plurality of digital objects associated with an XR anchor may comprise different billboard-style images, and the billboard-style image that is best aligned with the user's interests or demographics may be chosen for rendering. For instance, if the billboard-style images include advertisements for different vacation destinations, and the user has children, then the processing system may determine that an advertisement for a family-friendly resort would be appropriate to display to the user (as opposed to, for example, an advertisement for Las Vegas). Alternatively, if the billboard-style images included advertisements for local restaurants, and the user is known to have a shellfish allergy, then the processing system may determine that an advertisement for a steakhouse would be more appropriate than an advertisement for a seafood restaurant. In yet another example, advertising material may be customized to the user based on the user's current usage context, which as discussed above may be inferred from sensors in the XR device. For instance, if the sensors indicate that the user is moving quickly, then the processing system may determine that an advertisement for running shoes would be appropriate to render.

In step 316, processing system may detect that the current viewport of the user matches the predicted viewport that was predicted in step 304. For instance, the processing system may determine (e.g., based on data collected by sensors of the XR device) that the position of the viewport has changed by an amount and a direction that would be sufficient to bring the predicted viewport into view. Alternatively, the processing system may use image processing and/or recognition techniques to determine that XR anchors that were expected to be present in the predicted viewport are currently visible in the current viewport.

In step 318, the processing system may render the digital object for presentation by the XR device. For instance, if the digital object includes a visual element (e.g., an image, a video, text, or the like), then the digital object may be displayed on a display of the XR device. In one example, the visual element of the digital object may be rendered as an overlay that can be superimposed over the images of the real world environment that are visible on the display of the XR device. If the digital object includes an audio component (e.g., a sound effect, an audio track of a video, or the like), then the digital object may be played over a speaker of the XR device. If the digital object includes a haptic element (e.g., a rumble, a vibration, or the like), then the digital object may be transmitted over a haptic feedback element of the XR device. When the digital object is experienced by the user simultaneously with the real world environment, this creates XR media. It will be appreciated that many digital objects may be rendered simultaneously by the processing system, and that the digital objects may include various different modal elements. For instance, the processing system may simultaneously render a plurality of different digital objects, where one digital object may include a visual element, another digital object may include an audio element, yet another digital object may include a visual element and a haptic element, and so on.

In step 320, the processing system may optionally receive user feedback regarding the XR media. In one example, the user feedback may be explicit. For instance, the user may indicate (e.g., verbally, through the press of a button, through a predefined gesture, of the like) that he does or does not like a particular digital object, or the user may similarly request a specific digital object other than a digital object being rendered. Alternatively, the user may "bookmark" a digital object, e.g., by indicating that the digital object should be saved in a persistent memory or by placing a virtual marker that indicates that the user wishes to revisit the digital object in the future. In another example, the user feedback may be implicit. For instance, the processor may monitor the user's engagement with a digital object that is rendered (e.g., whether and for how long the user's gaze lingered on the digital object, whether and for how long the user interacted with the digital object, if the digital object was interactive, or the like).

In step 322, the processing system may optionally update a profile associated with the user, based on the feedback received in step 320. This may help the processing system to better customize the XR environment for the user in the future.

The method 300 may return to step 304, and may repeat steps 304-322 continuously for as long as the user is utilizing the XR device (or until the processing system receives a signal from the user to stop presenting the XR media, until the XR device is powered down, etc.). Thus, the user's viewport may be continuously predicted, and the digital objects associated with the anchors in the predicted viewport may be continuously cached, so that the digital objects can be rendered with little or no delay when the actual or current viewport aligns with the predicted viewport. This stands in contrast to conventional techniques, which may wait to identify and to cache digital objects until the anchors associated with the digital objects are present in the current viewport. Depending on the network conditions, this conventional approach may lead to delays in rendering the digital objects and/or sudden spikes in resource usage, which may detract from the user experience.

In further examples (e.g., where the processing system may have bandwidth to spare), digital objects whose locations lie beyond the boundaries of the predicted viewport (e.g., within some threshold distance) may additionally be cached to provide a margin of error. For instance, if the actual viewport overlaps, but does not perfectly align, with the predicted viewport, rendering of the XR media may still be expedited by utilizing cached digital objects whose locations may lie outside of the predicted viewport, but potentially inside of the actual viewport. Moreover, the XR media, and more specifically the rendered digital objects, can be customized to the user's preferences, location, lifestyle, current use context, and the like, which may improve the XR experience by making the experience more personalized. In addition, by downloading the digital objects directly from the anchors rather than from a remote server, the XR experience can be localized to the specific location at which the user is present.

Further examples of the present disclosure may extend beyond the realm of entertainment or informational applications. For instance, in some examples, known XR anchors that are present in a real world environment may be utilized to facilitate a public safety network. As an example, if an emergency such as a construction accident, a natural disaster, or the like is occurring in a specific location, then XR anchors that are present in that location could be used to disseminate information and/or instructions to XR device users whose viewports include those anchors. The information and/or instructions might include, for example, directions to guide the users safely away from the site of the emergency.

It should be noted that the method 300 may be expanded to include additional steps, or may be modified to replace steps with different steps, to combine steps, to omit steps, to perform steps in a different order, and so forth. For instance, as discussed above, in one example the processing system may repeat one or more steps of the method 300, such as steps 304-322, steps 304-318, etc. In another example, the method 300 may include storing one or more digital objects, e.g., at the XR device or at the edge server. The storing may be after step 322. For instance, the XR media, or at least a portion thereof, may be stored for other users who may be interested in experiencing the XR media via the respective XR devices that may be served by the processing system. Thus, these and other modifications are all contemplated within the scope of the present disclosure.

Figure 4:
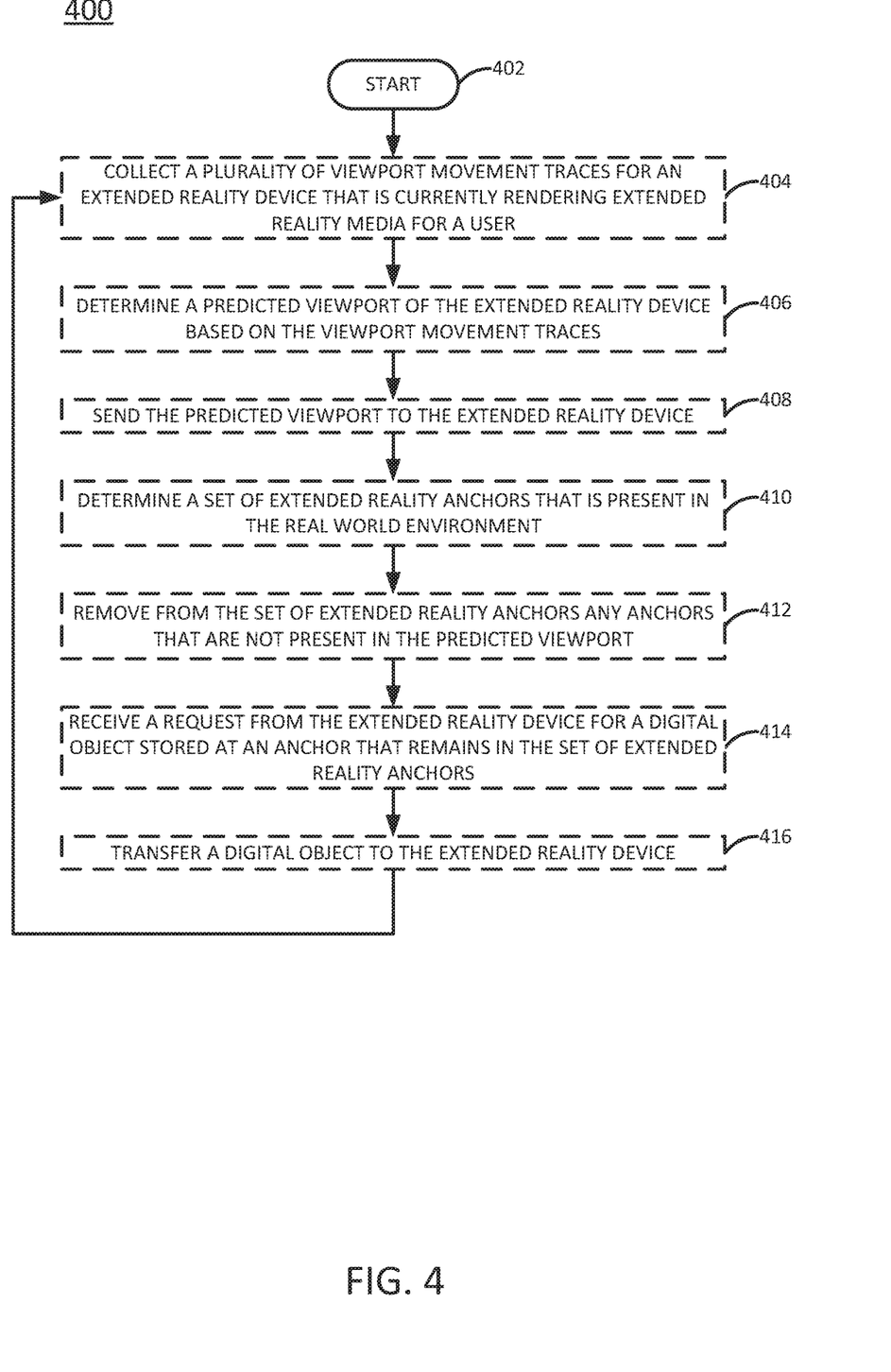
FIG. 4 illustrates a flowchart of another example method for rendering an extended reality environment, in accordance with the present disclosure.

FIG. 4 illustrates a flowchart of another example method 400 for rendering an extended reality environment, in accordance with the present disclosure. In one example, the method 400 is performed by a component of the system 100 of FIG. 1, such as by the AS 104, server 106, edge server 108, and so on, which may assist an XR device (e.g., device 112 of FIG. 1) in identifying digital objects to be downloaded and rendered for a user. In one example, the steps, functions, or operations of method 400 may be performed by a computing device or system 500, and/or processor 502 as described in connection with FIG. 5 below. For instance, the computing device or system 500 may represent any one or more components of the system 100 of FIG. 1 that is/are configured to perform the steps, functions and/or operations of the method 400. Similarly, in one example, the steps, functions, or operations of method 400 may be performed by a processing system comprising one or more computing devices collectively configured to perform various steps, functions, and/or operations of the method 400. For instance, multiple instances of the computing device or processing system 500 may collectively function as a processing system. For illustrative purposes, the method 400 is described in greater detail below in connection with an example performed by a processing system.

The method 400 begins in step 402 and may proceed to step 404. In step 404, the processing system may optionally collect a plurality of viewport movement traces from an XR device that is currently rendering XR media for a user. In one example, the viewport movement traces may be collected periodically, or according to another schedule.

In step 406, the processing system may optionally determine a predicted viewport of the XR device, based on the viewport movement traces. As discussed above, the predicted viewport may comprise a viewport that is expected to be visible to the user of the XR device at some time in the near future (e.g., in x seconds). The predicted viewport may be determined by the FoV of the XR device and the expected viewing direction of the XR device at the time in the near future. As discussed above, the FoV remains fixed (e.g., the width and height of the FoV do not change), but the expected viewing direction may be determined with six degrees of freedom.

In one example, the predicted viewport may be predicted using an MLM that analyzes the parameters of recent viewports of the XR device in order to determine where the predicted viewport is likely to be. The parameters of the recent viewports may include yaw, pitch, and roll measurements, and in some cases device location and/or camera position information, FoV information, and so forth. For instance, the recent viewport information may indicate a trajectory of the viewport in a general direction. It may be expected that the viewport movement is likely to continue in the same general direction as indicated by the trajectory, which may be quantified by the output of the MLM, i.e., the predicted viewport. In one example, the MLM may comprise a multi-scale time prediction model, as discussed above.

In step 408, the processing system may optionally send the predicted viewport to the XR device, e.g., so that the XR device may determine which XR anchors may be present in the predicted viewport as discussed above.

In step 410, the processing system may optionally determine a set of XR anchors that is present in the real world environment surrounding the XR device. As discussed above, the XR anchors may comprise beacons that are associated with locations or objects (e.g., IoT devices) in the real world environment. The XR anchors may store the digital objects, such as video files, advertisements, animation files, image files, or the like, which may be rendered by the XR device. When the digital objects are rendered by the XR device in a manner that allows the digital objects to be viewed simultaneously with the real world environment, an XR media is created.

In step 412, the processing system may optionally remove, from the set of XR anchors, a first subset of anchors. The first subset of anchors may include anchors that are not present in the predicted viewport (or within a configurable distance from the boundary of the predicted viewport). This step leaves a second subset of anchors remaining in the set, where the second subset of anchors includes anchors that are present in (or are within the configurable distance from the boundary of) the predicted viewport. As discussed above, the real world environment may contain tens, hundreds, or even thousands of XR anchors, but only a small subset of these XR anchors may be present in the predicted viewport. Thus, by removing from the set of XR anchors any anchors that are not present in the predicted viewport (or not within the configurable distance from the predicted viewport's boundary), the number of digital objects that may potentially be downloaded by the XR device may be greatly reduced. This will ultimately improve the computational efficiency and accuracy of the XR device.

In one example, the locations of at least some of the XR anchors are known in advance. For instance, an index may map XR anchors to specific locations (e.g., latitude and longitude) in the real world environment, where the XR anchors may be fixed at those locations. In another example, an XR anchor that comprises an IoT device may emit a signal (e.g., a Bluetooth, infrared, or electromagnetic signal) that can be detected by the XR device, where the signal either identifies the location of the XR anchor or allows the processing system to determine the location through further analysis of the signal. The XR device in this case may provide the locations of the XR anchors to the processing system.

In step 414, the processing system may receive, from the extended reality device, a request for a digital object that is stored at one of the anchors that still remains in the set of XR anchors (e.g., an anchor of the second subset).

In step 416, the processing system may optionally transfer a digital object to the XR device. As discussed above, the digital object may be associated with an XR anchor that is present in the predicted viewport of the XR device, and the XR device may wish to cache the digital object for use when the XR device's current viewport matches the predicted viewport. In one example, where the processing system is part of an edge server, the edge server may cache at least some of the digital objects that may be associated with the XR anchors in the set of XR anchors. Similarly, where the processing system is part of an application server, the application server may store or have access to a database that stores at least some of the digital objects that may be associated with the XR anchors in the set of XR anchors. For instance, the edge server, the application server, and or the database may store a number of the most frequently downloaded digital objects (e.g., most frequently downloaded over the last day, over the last week, or for as long as records have been kept), or a number of the most recently downloaded digital objects. Thus, the XR device may download a digital object from the edge server, the application server, and/or the database in some examples.

The method 400 may return to step 404, and may repeat any combination of steps 404-416 continuously for as long as the user is utilizing the XR device (or until the processing system receives a signal from the user to stop presenting the XR media, until the XR device is powered down, etc.).

It should be noted that the method 400 may be expanded to include additional steps, or may be modified to replace steps with different steps, to combine steps, to omit steps, to perform steps in a different order, and so forth, depending on the role of the edge server, the application server, and/or the database in the rendering of the XR media. As discussed above, all of the steps of the method 300 may be performed by a processing system of the XR device, without assistance from an intermediary, if the XR device has access to sufficient processing and/or memory resources. However the XR device may also offload some of the steps to a second device such as an edge server, an application server, or the like.

For instance, in one example, the XR device may rely on the second device to determine the predicted viewport (e.g., according to steps 404-406 of the method 400), and, once the predicted viewport is determined, the XR device may determine the set of XR anchors that is present in the predicted viewport. In another example, the second device may both determine the predicted viewport and determine the set of XR anchors that is present in the predicted viewport (e.g., according to steps 404-408 of the method 400). In another example, the XR device may determine its own predicted viewport, but may rely on the second device to identify the XR anchors that are present in the predicted viewport (e.g., according to step 408 of the method 400). In another example, the XR device may determine the predicted viewport and the set of XR anchors that is present in the predicted viewport, and may simply download selected digital objects associated with the XR anchors from the second device. In this case, the second device may only transfer the selected digital objects to the XR device (e.g., according to step 410 of the method 400).

In further examples, the processing system may repeat one or more steps of the method 400, such as steps 404-406, step 410, etc. In another example, the method 400 may include storing one or more digital objects, e.g., at the edge server, the application server, and/or the database. For instance, the XR media, or at least a portion thereof, may be stored for other users who may be interested in experiencing the XR media via the respective XR devices that may be served by the processing system. Thus, these and other modifications are all contemplated within the scope of the present disclosure.

In addition, although not expressly specified above, one or more steps of the methods 300 and 400 may include a storing, displaying and/or outputting step as required for a particular application. In other words, any data, records, fields, and/or intermediate results discussed in the method can be stored, displayed and/or outputted to another device as required for a particular application. Furthermore, operations, steps, or blocks in FIGS. 3 and 4 that recite a determining operation or involve a decision do not necessarily require that both branches of the determining operation be practiced. In other words, one of the branches of the determining operation can be deemed as an optional step. Furthermore, operations, steps or blocks of the above described method(s) can be combined, separated, and/or performed in a different order from that described above, without departing from the example embodiments of the present disclosure.

FIG. 5 depicts a high-level block diagram of a computing device or processing system specifically programmed to perform the functions described herein. For example, any one or more components or devices illustrated in FIG. 1, or described in connection with the methods 300 and 400 of FIGS. 3 and 4 may be implemented as the processing system 500. As depicted in FIG. 5, the processing system 500 comprises one or more hardware processor elements 502 (e.g., a microprocessor, a central processing unit (CPU) and the like), a memory 504, (e.g., random access memory (RAM), read only memory (ROM), a disk drive, an optical drive, a magnetic drive, and/or a Universal Serial Bus (USB) drive), a module 505 for XR anchor caching based on viewport prediction, and various input/output devices 506, e.g., a camera, a video camera, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like).

Although only one processor element is shown, it should be noted that the computing device may employ a plurality of processor elements. Furthermore, although only one computing device is shown in the Figure, if the method(s) as discussed above is implemented in a distributed or parallel manner for a particular illustrative example, i.e., the steps of the above method(s) or the entire method(s) are implemented across multiple or parallel computing devices, e.g., a processing system, then the computing device of this Figure is intended to represent each of those multiple general-purpose computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 502 can also be configured or programmed to cause other devices to perform one or more operations as discussed above. In other words, the hardware processor 502 may serve the function of a central controller directing other devices to perform the one or more operations as discussed above.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computing device, or any other hardware equivalents, e.g., computer readable instructions pertaining to the method(s) discussed above can be used to configure a hardware processor to perform the steps, functions and/or operations of the above disclosed method(s). In one example, instructions and data for the present module or process 505 for XR anchor caching based on viewport prediction (e.g., a software program comprising computer-executable instructions) can be loaded into memory 504 and executed by hardware processor element 502 to implement the steps, functions or operations as discussed above in connection with the example method(s). Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 505 for XR anchor caching based on viewport prediction (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not limitation. Thus, the breadth and scope of a preferred embodiment should not be limited by any of the above-described example embodiments, but should be defined only in accordance with the following claims and their equivalents.

What is claimed is:

1. A method, comprising:

determining, by a processing system of a mobile device including at least one processor, a predicted viewport of the mobile device, wherein the predicted viewport defines a portion of a real world environment that is expected to be visible to a user of the mobile device at a future time, and wherein the predicted viewport is determined using a multi-scale time prediction model that uses a short term prediction to predict the predicted viewport based on an orientation of the mobile device and a long term prediction to predict the predicted viewport based on historical behavior of the user while using the mobile device, wherein the historical behavior of the user is modeled by a user behavior model that is derived from a user profile which describes at least one interest of the user and at least one digital object cached by the user, and wherein the user behavior model identifies types of interactive digital objects that the user has looked at and interacted with in the past and types of digital objects that the user has ignored in the past;

determining, by the processing system, a set of extended reality anchors that are present in the real world environment, wherein each anchor of the extended reality anchors stores a digital object that, when rendered by the mobile device and presented to the user simultaneously with the real world environment, creates extended reality media;

removing, by the processing system, a first subset of the extended reality anchors from the set, wherein locations of extended reality anchors in the first subset of extended reality anchors fall outside of a threshold distance from a boundary of the predicted viewport, and wherein the removing results in a second subset of extended reality anchors remaining in the set; and downloading, by the processing system, a digital object from a second device, wherein the digital object is stored by an anchor of the second subset of the extended reality anchors.

2. The method of claim 1, wherein the predicted viewport is defined by a field of view of the mobile device and a direction in which the user is expected to be looking at the future time.

3. The method of claim 2, wherein the direction in which the user is expected to be looking is determined with six degrees of freedom including: three axes of position that define coordinates of the mobile device in the real world environment and three dimensions of viewing direction defined by a yaw, a pitch, and a roll of the mobile device.

4. The method of claim 3, wherein the determining the predicted viewport comprises:

applying, by the processing system, the multi-scale time prediction model on the yaw, the pitch, and the roll for a plurality of recent viewports of the mobile device, wherein an output of the multi-scale time prediction model is the predicted viewport.

5. The method of claim 3, wherein the determining the predicted viewport comprises:

sending, by the processing system, data to a remote device, wherein the data comprises the yaw, the pitch, and the roll for a plurality of recent viewports of the mobile device; and receiving, by the processing system from the remote device, the predicted viewport, wherein the predicted viewport is an output of the multi-scale time prediction model that is applied by the remote device on the data.

6. The method of claim 1, wherein locations of at least some extended reality anchors of the plurality of extended reality anchors are known from an index.

7. The method of claim 1, wherein locations of at least some extended reality anchors of the plurality of extended reality anchors are determined based on signals emitted by the at least some extended reality anchors.

8. The method of claim 1, wherein the second device is the anchor of the second subset of the extended reality anchors that stores the digital object.

9. The method of claim 1, wherein the second device is an edge server of an access network to which the processing system is connected, wherein the edge server has previously cached the digital object from the anchor.

10. The method of claim 1, wherein the second device is another mobile device that has previously downloaded the digital object from the anchor.

11. The method of claim 1, wherein the second device is an application server in a telecommunications network to which the mobile device is connected.

12. The method of claim 1, further comprising:

customizing, by the processing system, the digital object for the user; and presenting, by the processing system, the digital object to the user simultaneously with the real world environment, wherein the presenting is performed subsequent to the customizing.

13. The method of claim 12, wherein the customizing comprises selecting a particular version of the digital object from among a plurality of versions of the digital object, based on information in a stored profile of the user.

14. The method of claim 12, wherein the customizing comprises selecting a particular version of the digital object from among a plurality of versions of the digital object, based on a current use context of the user.

15. The method of claim 12, further comprising:

receiving, by the processing system, feedback from the user in response to the presenting; and updating, by the processing system, a stored profile of the user, based on the feedback.

16. The method of claim 1, wherein the user behavior model is further used to customize at least one of: an appearance of a first digital object stored by a first anchor of the set of extended reality anchors or a language in which the first digital object is presented.

17. A non-transitory computer-readable medium storing instructions which, when executed by a processing system of a mobile device including at least one processor, cause the processing system to perform operations, the operations comprising:

determining a predicted viewport of the mobile device, wherein the predicted viewport defines a portion of a real world environment that is expected to be visible to a user of the mobile device at a future time, and wherein the predicted viewport is determined using a multi-scale time prediction model that uses a short term prediction to predict the predicted viewport based on an orientation of the mobile device and a long term prediction to predict the predicted viewport based on historical behavior of the user while using the mobile device, wherein the historical behavior of the user is modeled by a user behavior model that is derived from a user profile which describes at least one interest of the user and at least one digital object cached by the user, and wherein the user behavior model identifies types of interactive digital objects that the user has looked at and interacted with in the past and types of digital objects that the user has ignored in the past;

determining a set of extended reality anchors that are present in the real world environment, wherein each anchor of the extended reality anchors stores a digital object that, when rendered by the mobile device and presented to the user simultaneously with the real world environment, creates extended reality media;

removing a first subset of the extended reality anchors from the set, wherein locations of extended reality anchors in the first subset of extended reality anchors fall outside of a threshold distance from a boundary of the predicted viewport, and wherein the removing results in a second subset of extended reality anchors remaining in the set; and downloading a digital object from a second device, wherein the digital object is stored by an anchor of the second subset of the extended reality anchors.

18. A method, comprising:

determining, by a processing system of a server in a telecommunication service provider network, wherein the processing system includes at least one processor, a predicted viewport of a mobile device, wherein the predicted viewport defines a portion of a real world environment that is expected to be visible to a user of the mobile device at a future time, and wherein the predicted viewport is determined using a multi-scale time prediction model that uses a short term prediction to predict the predicted viewport based on an orientation of the mobile device and a long term prediction to predict the predicted viewport based on historical behavior of the user while using the mobile device, wherein the historical behavior of the user is modeled by a user behavior model that is derived from a user profile which describes at least one interest of the user and at least one digital object cached by the user, and wherein the user behavior model identifies types of interactive digital objects that the user has looked at and interacted with in the past and types of digital objects that the user has ignored in the past;

determining, by the processing system, a set of extended reality anchors that are present in the real world environment, wherein each anchor of the extended reality anchors stores a digital object that, when rendered by the mobile device and presented to the user simultaneously with the real world environment, creates extended reality media;

removing, by the processing system, a first subset of the extended reality anchors from the set, wherein locations of extended reality anchors in the first subset of extended reality anchors fall outside of a threshold distance from a boundary of the predicted viewport, and wherein the removing results in a second subset of extended reality anchors remaining in the set; and providing, by the processing system and subsequent to the removing, the set to the mobile device.

19. The method of claim 18, wherein the determining comprises:

obtaining, by the processing system, yaw, pitch, the roll measurements for a plurality of recent viewports of the mobile device; and applying, by the processing system, the multi-scale time prediction model to the yaw, pitch and roll measurements, wherein an output of the multi-scale time prediction model is the predicted viewport.

20. The method of claim 18, further comprising:

receiving, by the processing system, a request from the mobile device for a digital object that is stored by an anchor of the second subset of the extended reality anchors; and transferring, by the processing system, a copy of the digital object to the mobile device.

* * * * *